United States Patent [19]

Hilliard

[11] Patent Number: 5,146,706
[45] Date of Patent: Sep. 15, 1992

[54] WEEDLESS FISHING LURE APPARATUS

[76] Inventor: Vernon D. Hilliard, 637 Delaware Ave., Burlington, N.C. 27215

[21] Appl. No.: 770,439

[22] Filed: Oct. 3, 1991

[51] Int. Cl.$^5$ .............................................. A01K 85/00
[52] U.S. Cl. .................................. 43/42.13; 43/42.44; 43/42.11
[58] Field of Search ................. 43/42.13, 42.44, 42.11, 43/42.14, 42.39, 35

[56] References Cited

U.S. PATENT DOCUMENTS

| | | | |
|---|---|---|---|
| 1,033,281 | 7/1912 | Skvor | 43/42.44 |
| 1,069,093 | 7/1913 | Faught | 43/42.44 |
| 1,854,024 | 4/1932 | Farley | 43/42.44 |
| 1,995,985 | 3/1935 | Jennings | 43/42.13 |
| 2,674,060 | 4/1954 | Simmons | 43/42.44 |
| 3,143,824 | 8/1964 | Thomas | 43/42.11 |
| 3,996,688 | 12/1976 | Hardwicke | 43/42.11 |
| 4,209,932 | 7/1980 | Pate | 43/42.13 |
| 4,823,500 | 4/1989 | Shindeldecker | 43/42.13 |

Primary Examiner—Kurt Rowan
Attorney, Agent, or Firm—Leon Gilden

[57] ABSTRACT

A fishing lure including a spinner assembly is formed with a rigid rod mounting a support head that in turn includes a mounting loop formed with a flexible shape-retentent polymeric hub mounting a plurality of fishing hooks thereon, wherein the fishing hooks are arranged in a confronting relationship relative to one another, with opposing hook portions aligned with an opposing shank in a first position and displaced to a second position exposing each hook by application of pressure to the shank structure by a fish strike.

3 Claims, 3 Drawing Sheets

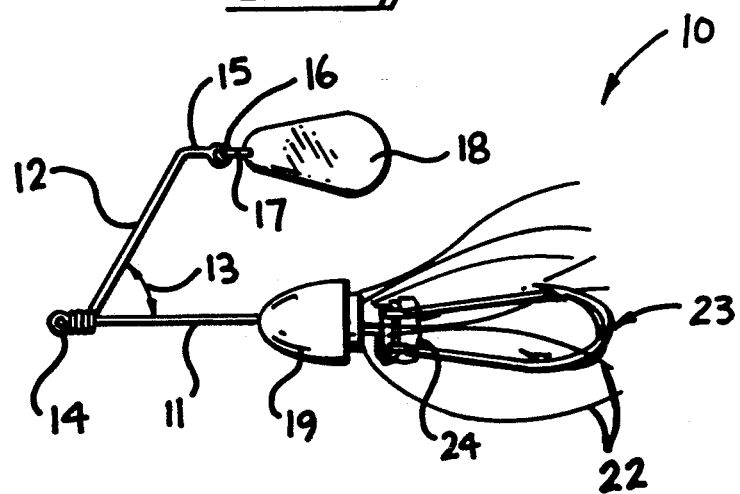
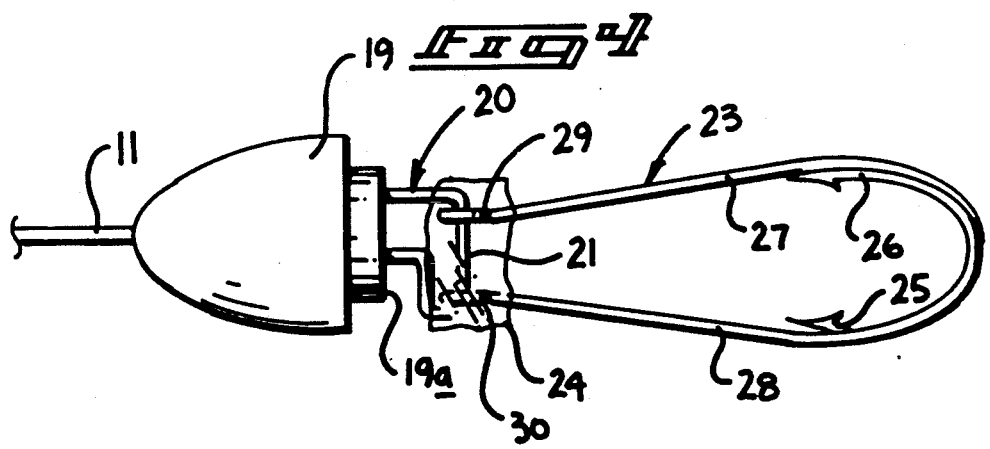
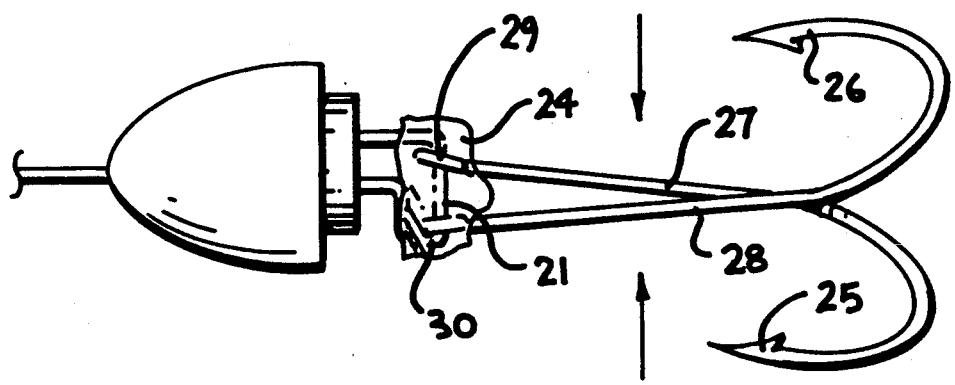

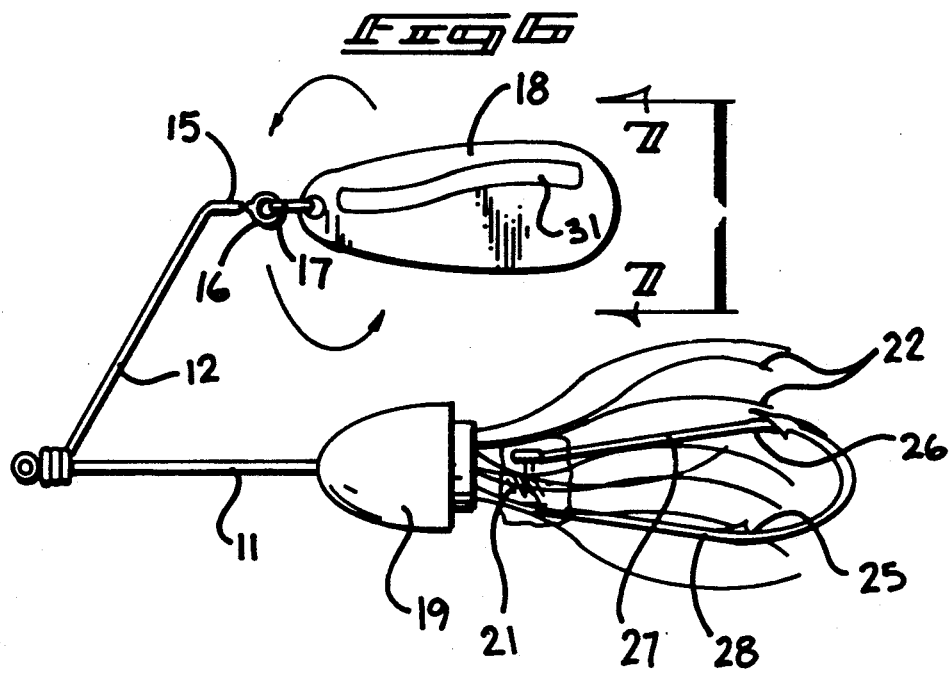
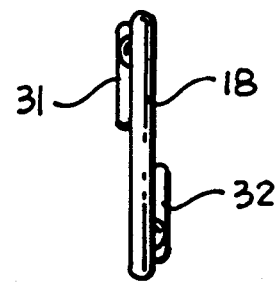
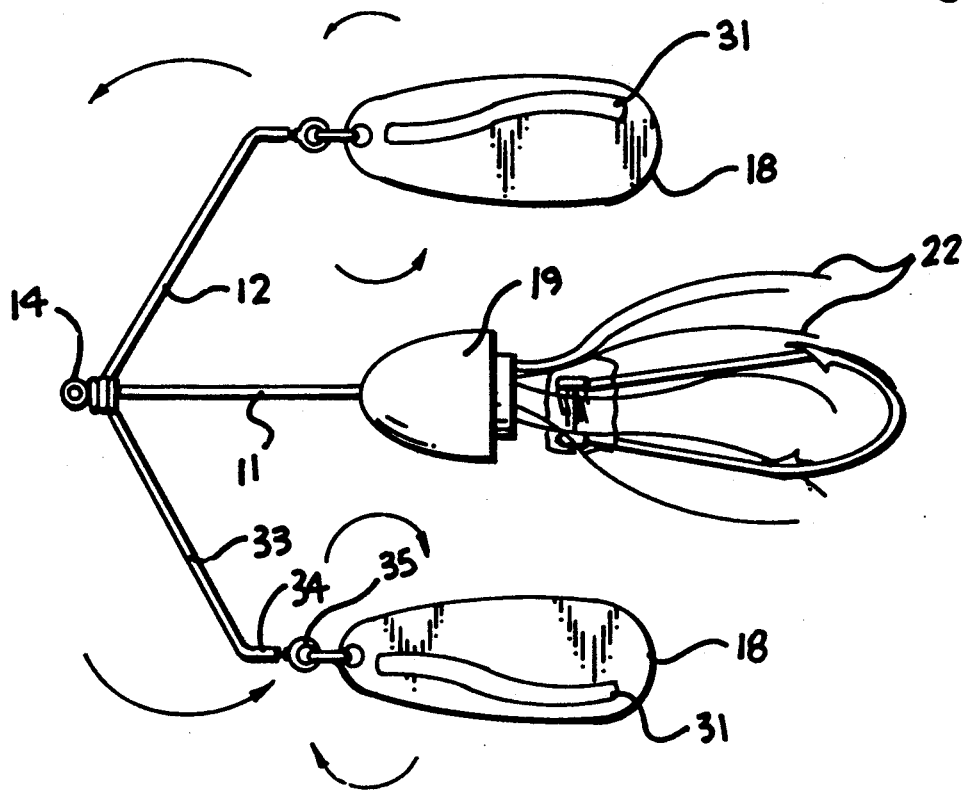

WEEDLESS FISHING LURE APPARATUS

BACKGROUND OF THE INVENTION

1. Field of the Invention

The field of invention relates to fishing lure apparatus, and more particularly pertains to a new and improved weedless fishing lure apparatus wherein the hook portions of opposing shanks are contiguous with and aligned with opposing shanks to prevent engagement of the hooks with various under water projections.

2. Description of the Prior Art

An ever present consideration in fishing is the snagging and engagement of a fishing hook with an underlying projection such as vegetation, debris, and the like. This associated engagement with such structure above and below a fishing body of water has been a source of frustration and associated loss of fishing hooks and time associated with the fishing sport. Prior art structure has been available to prevent such engagement and is exemplified in U.S. Pat. Nos. 4,793,090 to Cooper and 4,782,618 to Rainey formed of a more complex organization limiting application in fishing environments.

U.S. Pat. No. 4,718,191 to Gentry sets forth an artificial fishing lure formed with a spinner assembly operative with and cooperative with a central fishing hook.

As such, it may be appreciated that there continues to be a need for a new and improved weedless fishing lure as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fishing lure apparatus now present in the prior art, the present invention provides a weedless fishing lure apparatus wherein the same is arranged to position opposing hooks in contiguous and aligned orientation relative to opposing shanks that are arranged in a coplanar relationship relative to one another in a first position permitting deflection of a second position providing exposure of the hooks for engagement of a fish. As such, the general purpose of the present invention, which will be described subsequently in greater detail, is to provide a new and improved weedless fishing lure apparatus which has all the advantages of the prior art fishing lure apparatus and none of the disadvantages.

To attain this, the present invention provides a fishing lure including a spinner assembly formed with a rigid rod mounting a support head that in turn includes a mounting loop formed with a flexible shape-retentent polymeric hub mounting a plurality of fishing hooks thereon, wherein the fishing hooks are arranged in a confronting relationship relative to one another, with opposing hook portions aligned with an opposing shank in a first position and displaced to a second position exposing each hook by application of pressure to the shank structure by a fish strike.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved weedless fishing lure apparatus which has all the advantages of the prior art fishing lure apparatus and none of the disadvantages.

It is another object of the present invention to provide a new and improved weedless fishing lure apparatus which may be easily and efficiently manufactured and marketed.

It is a further object of the present invention to provide a new and improved weedless fishing lure apparatus which is of a durable and reliable construction.

An even further object of the present invention is to provide a new and improved weedless fishing lure apparatus which is susceptible of a low cost of manufacture with regard to both materials and labor, and which accordingly is then susceptible of low prices of sale to the consuming public, thereby making such weedless fishing lure apparatus economically available to the buying public.

Still yet another object of the present invention is to provide a new and improved weedless fishing lure apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic top view of the instant invention.

FIG. 4 is an enlarged orthographic view of the hook assembly in a first position.

FIG. 5 is an orthographic top view of the hook assembly in a second deflected position.

FIG. 6 is an orthographic top view of the apparatus utilizing a modified spinner.

FIG. 7 is an orthographic view, taken along the lines 7—7 of FIG. 6 in the direction indicated by the arrows.

FIG. 8 is an orthographic top view utilizing a multiplicity of spinners in association with a hook structure.

DESCRIPTION OF THE PREFERRED EMBODIMENT

Figure 1:
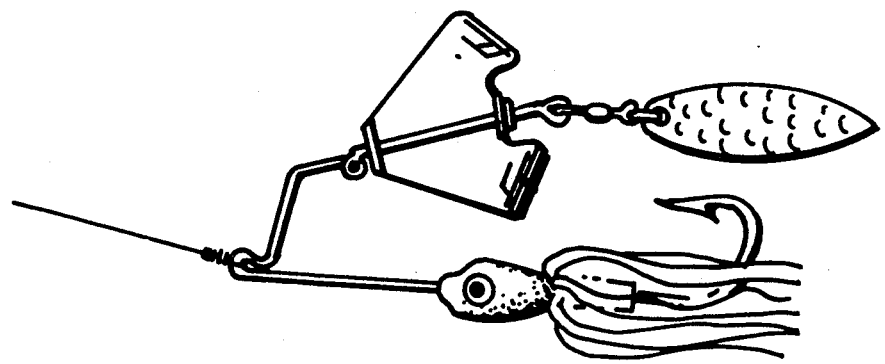
FIG. 1 and FIG. 2 illustrate a prior art fishing lure organization incorporating a spinner assembly, as viewed in a top orthographic illustration.

With reference now to the drawings, and in particular to FIGS. 1 to 8 thereof, a new and improved weedless fishing lure apparatus embodying the principles and concepts of the present invention and generally designated by the reference numeral 10 will be described.

Figure 2:
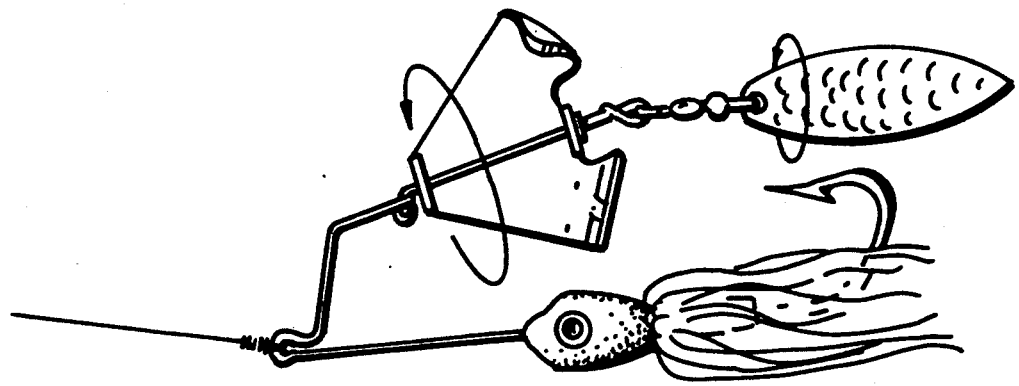

FIGS. 1 and 2 set forth a prior art structure, as set forth in U.S. Pat. No. 4,718,191, illustrating a fishing lure utilizing a spinner and associated counterweight structure typical of prior art fishing lure configurations.

More specifically, the weedless fishing lure apparatus 10 of the instant invention essentially comprises a first rigid support rod 11 mounted to a second rigid support rod 12 at an eye loop junction 14 defining an eye loop therethrough for receiving a distal end of a fishing line (not shown). The first and second rigid support rods 11 and 12 define a predetermined acute angle 13 therebetween. A second rod extension leg 15 is mounted to the second rigid support rod 12 oriented parallel relative to the first rigid support rod terminating in a second rod eye 16. A pivot link 17 mounted to the second rod eye 16 pivotally mounts a spinner plate 18 at a forward distal end of the spinner plate.

A support head 19 is fixedly and coaxially aligned relative to a forward distal end of the first rigid support rod 11 spaced from the eye loop junction 14 and including a support head base 19a spaced from the forward distal end of the first rigid support rod 11 as illustrated. A mounting loop 20 fixedly secured to the support head base 19a is formed with a mounting loop support leg 21 that is orthogonally oriented relative to the first rigid support rod 11. A plurality of strands 22 project rearwardly and are mounted to the support head base 19a for camouflaging a hook assembly 23 mounted to the mounting loop support leg 21. The hook assembly 23 includes a respective first and second hook member 25 and 26, with the first and second hook member 25 and 26 each including a respective first and second hook member shank 27 and 28 respectively. Each first and second shank 27 and 28 terminates in a respective first and second shank loop 29 and 30 that in turn is pivotally mounted to the mounting loop support leg 21. A flexible shape retentent polymeric hub 24 completely encases the mounting loop support leg 21 and the associated first and second shank loops 29 and 30 to maintain the first and second hook members 25 and 26 in a first position, as illustrated in FIG. 4. In the first position, the first hook member and the second hook member 25 and 26 are spaced from the first shank 27 and second shank 28 an equal predetermined spacing, wherein the first and second hook members 25 and 26 are arranged in contiguous aligned communication with the respective second and first shanks 28 and 27, as illustrated. Further as illustrated, the first and second shanks 27 and 28 are arranged in a coplanar relationship relative to one another. Upon engagement and strike of a fish, the first and second shanks 27 and 28 are displaced, as illustrated in FIG. 5, to expose by displacement the respective first and second hook members 25 and 26. Should a fish escape or be released, the polymeric hub 24 biases the hook members and the shanks into the first position, as illustrated in FIG. 4, from the second position, as illustrated in FIG. 5.

The FIG. 6 illustrates the use of a modified spinner plate 18, including a respective first and second serpentine tube 31 and 32 respectively (see FIG. 7) mounted to opposed sides of the spinner plate 18 in a displaced spacing relative to one another to the opposed sides, wherein the first serpentine tube 31 is mounted adjacent an upper portion of the forward surface of the plate 18, wherein the second serpentine tube 32 is mounted to a lower portion of the rear surface of the plate 18. The invention, as illustrated in FIG. 8, includes a plurality of the spinner plates 18 mounted to opposed sides of the first rigid support rod 11. In this manner, a third rigid support rod 33 coplanar with the first and second support rods 11 and 12 is positioned to an opposed side of the first rod 11 defining the acute angle between the first rod 11 and the third rod 33. A third rigid support rod extension leg 34 oriented parallel to the first rod 11 includes a third rod extension loop 35 to pivotally mount a duplicate spinner plate 18, as illustrated. The tubular serpentine member is mounted to opposed sides of each spinner plate and effects the rotation of the spinner plates to provide for a luring and attraction of various game fish.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A weedless fishing lure apparatus, comprising,
   a first rigid support rod, the first rigid support rod secured to a second rigid support rod at an eye loop junction defining an eye loop, wherein a predetermined acute angle is defined between the first rigid support rod and the second rigid support rod, and the second rigid support rod including a second rod extension leg oriented parallel to the first rigid support rod terminating in a second rod eye, and a spinner plate including a spinner plate forward distal end pivotally mounted to the second rod eye, and the first rigid support rod including a support head mounted at a support head forward distal end spaced from the eye loop junction, including a support head base, and a mounting loop fixedly secured to the support head base including a support leg, wherein the support leg is arranged orthogonally relative to the first rigid support rod, and a hook assembly mounted to the support leg, and a matrix of strands pivotally secured to the support head base extending in surrounding relationship to the hook assembly to effect camouflage of the hook assembly, and the hook assembly includes a first hook member and a second hook member, the first hook member including a first shank, and the second hook member including a second shank, and the first shank including a first loop and the second shank including a second loop, the first loop and the second loop pivotally mounted to the support leg, and a flexible shape retentent polymeric hub arranged to completely encase the first loop, the second loop, and the support leg to maintain the first shank and the second shank in a first position.

2. An apparatus as set forth in claim 1 wherein the first hook member is arranged contiguously with the second shank, and the second hook member is arranged contiguously with the first shank in the first position, and the first shank and the second shank are displaced to a second position upon a fish strike directed upon the hook assembly, wherein the first shank and the second shank are arranged in a coplanar relationship in the first position and the second position, and the first hook member and the second hook member are arranged in a coplanar relationship in the second position.

3. An apparatus as set forth in claim 2 wherein the spinner plate includes a forward surface and a rear surface, wherein the forward surface and rear surface are arranged in a parallel spaced relationship relative to one another, and the forward surface includes a first serpentine tube mounted to the forward surface longitudinally aligned with the spinner plate, and the rear surface includes a second serpentine tube mounted to the rear surface longitudinally aligned with the spinner plate, wherein the first serpentine tube and the second serpentine tube are vertically displaced relative to one another relative to the spinner plate.

* * * * *